United States Patent
Inokuchi

(10) Patent No.: US 8,280,933 B2
(45) Date of Patent: Oct. 2, 2012

(54) INFORMATION PROCESSING APPARATUS, CONTROL METHOD, CONTROL PROGRAM, AND NAME MAPPING INFORMATION

(75) Inventor: Tatsuya Inokuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 356 days.

(21) Appl. No.: 12/425,606

(22) Filed: Apr. 17, 2009

(65) Prior Publication Data

US 2009/0276462 A1 Nov. 5, 2009

(30) Foreign Application Priority Data

Apr. 30, 2008 (JP) ................................ 2008-118927

(51) Int. Cl.
*G06F 17/30* (2006.01)
*H04N 9/80* (2006.01)
(52) U.S. Cl. ........................................ 707/831; 386/241
(58) Field of Classification Search .................. 707/822, 707/831
See application file for complete search history.

(56) References Cited

U.S. PATENT DOCUMENTS

| | | | | |
|---|---|---|---|---|
| 7,711,759 B2 * | 5/2010 | Seo et al. | ....................... | 707/822 |
| 2005/0131858 A1 * | 6/2005 | Seo et al. | ........................ | 707/1 |
| 2007/0061849 A1 * | 3/2007 | Walker et al. | .................... | 725/86 |
| 2007/0136282 A1 * | 6/2007 | Takashima | ....................... | 707/6 |
| 2008/0133564 A1 * | 6/2008 | Gandolph et al. | ............. | 707/101 |
| 2009/0063659 A1 * | 3/2009 | Kazerouni et al. | ............ | 709/219 |
| 2009/0228520 A1 * | 9/2009 | Yahata et al. | ............. | 707/104.1 |
| 2010/0034518 A1 * | 2/2010 | Iwamoto et al. | ................ | 386/95 |
| 2011/0080462 A1 * | 4/2011 | Yamaji et al. | .................. | 348/42 |
| 2011/0299833 A1 * | 12/2011 | Ikeda | ............................ | 386/248 |

* cited by examiner

*Primary Examiner* — Tarek Chbouki
*Assistant Examiner* — Arshia S Kia
(74) *Attorney, Agent, or Firm* — Oblon, Spivak, McClelland, Maier & Neustadt, L.L.P.

(57) ABSTRACT

An information processing apparatus includes a local storage in which a virtual file system is created, the virtual file system supporting an information recording medium on which encrypted content on which an encryption process has been performed is recorded, the encrypted content being managed for each of content management units serving as content use management units, and on which content management units used by the encrypted content are set; and a playback unit configured to read and play back the encrypted content managed by the content management units used by the encrypted content by using the virtual file system created in the local storage, configured to receive a data distribution file set for linking other information with the encrypted content of the information recording medium, the encrypted content being distributed from an information distribution server, and configured to update the virtual file system using the received data distribution file set.

22 Claims, 8 Drawing Sheets

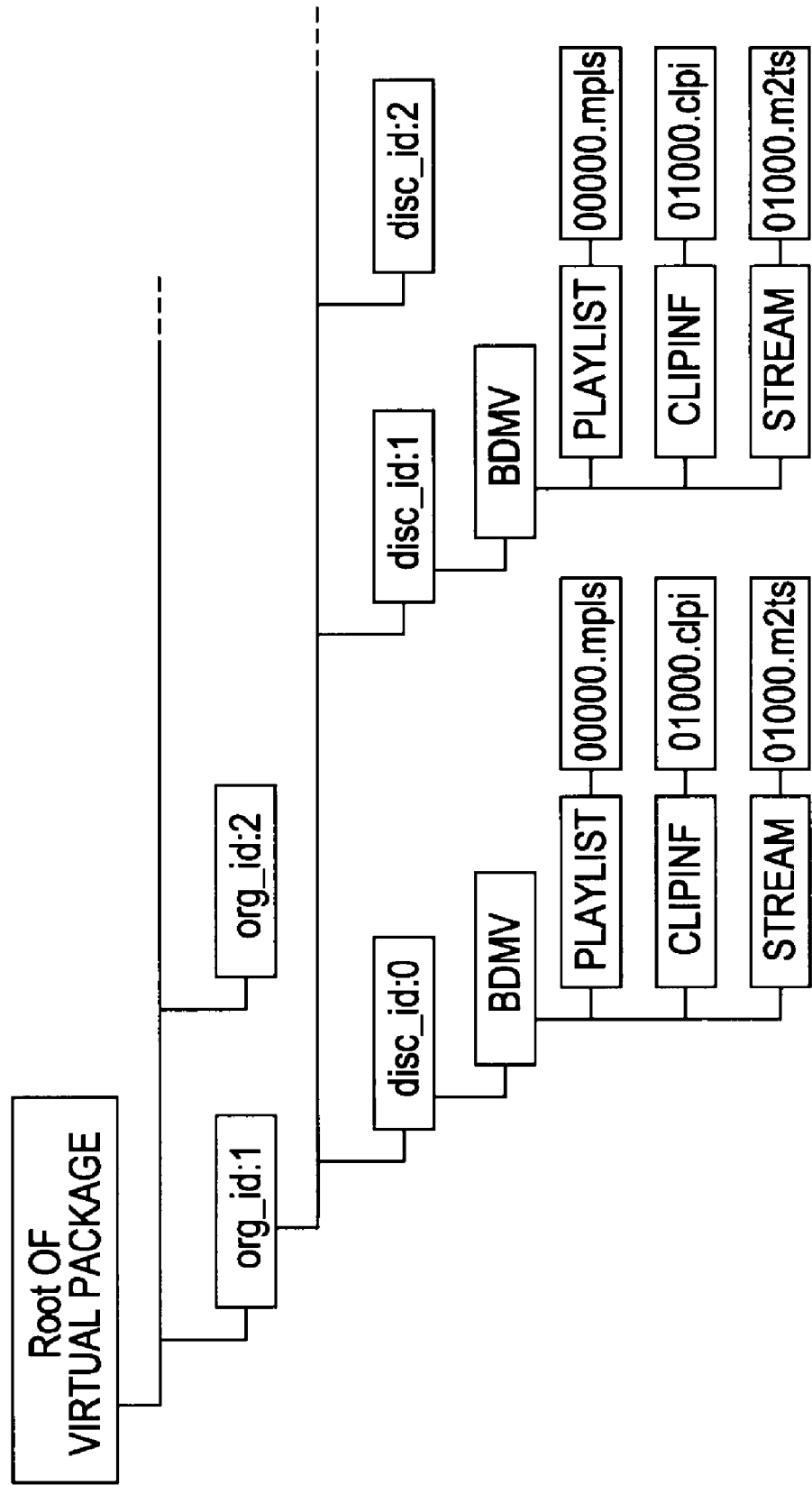

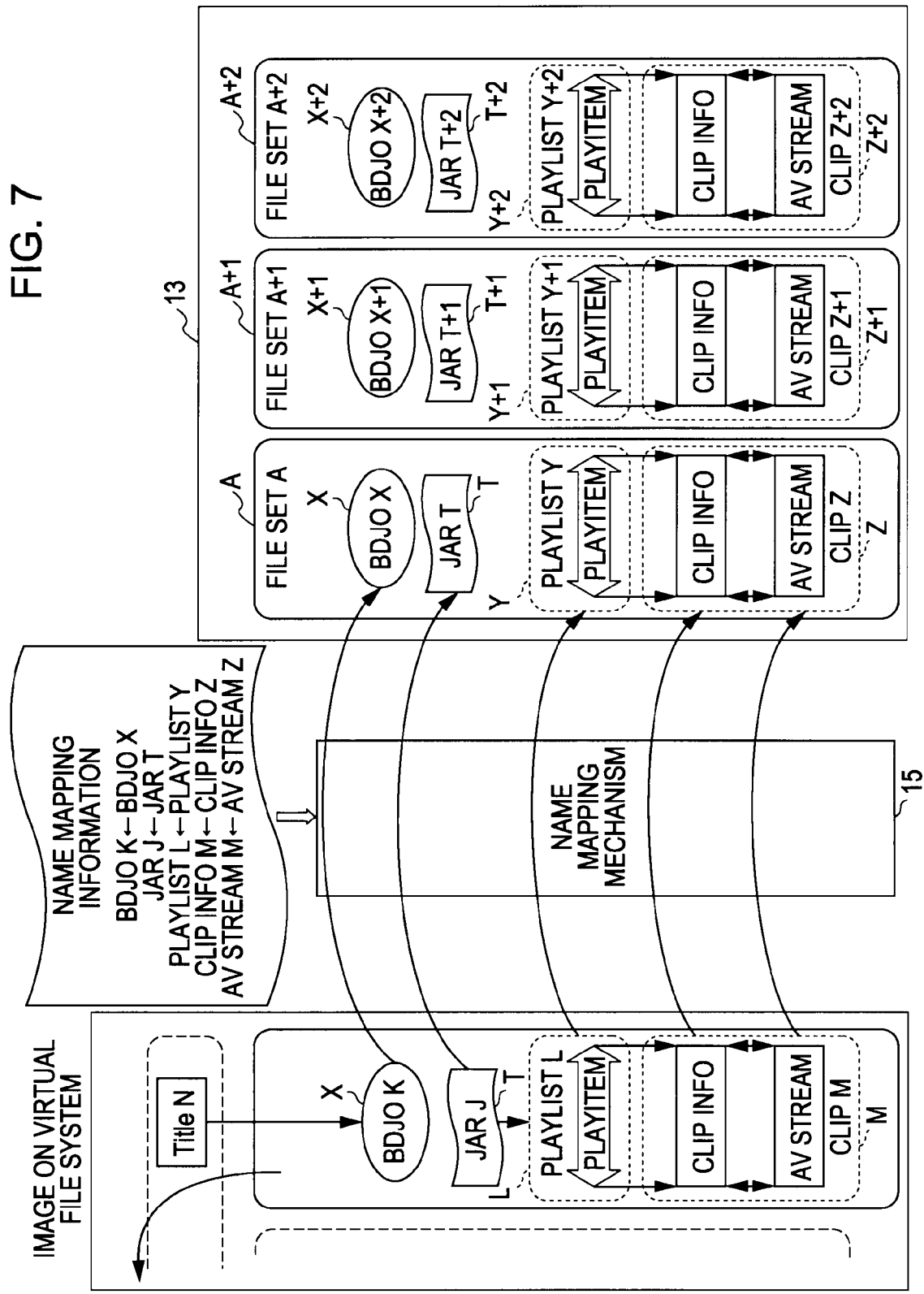

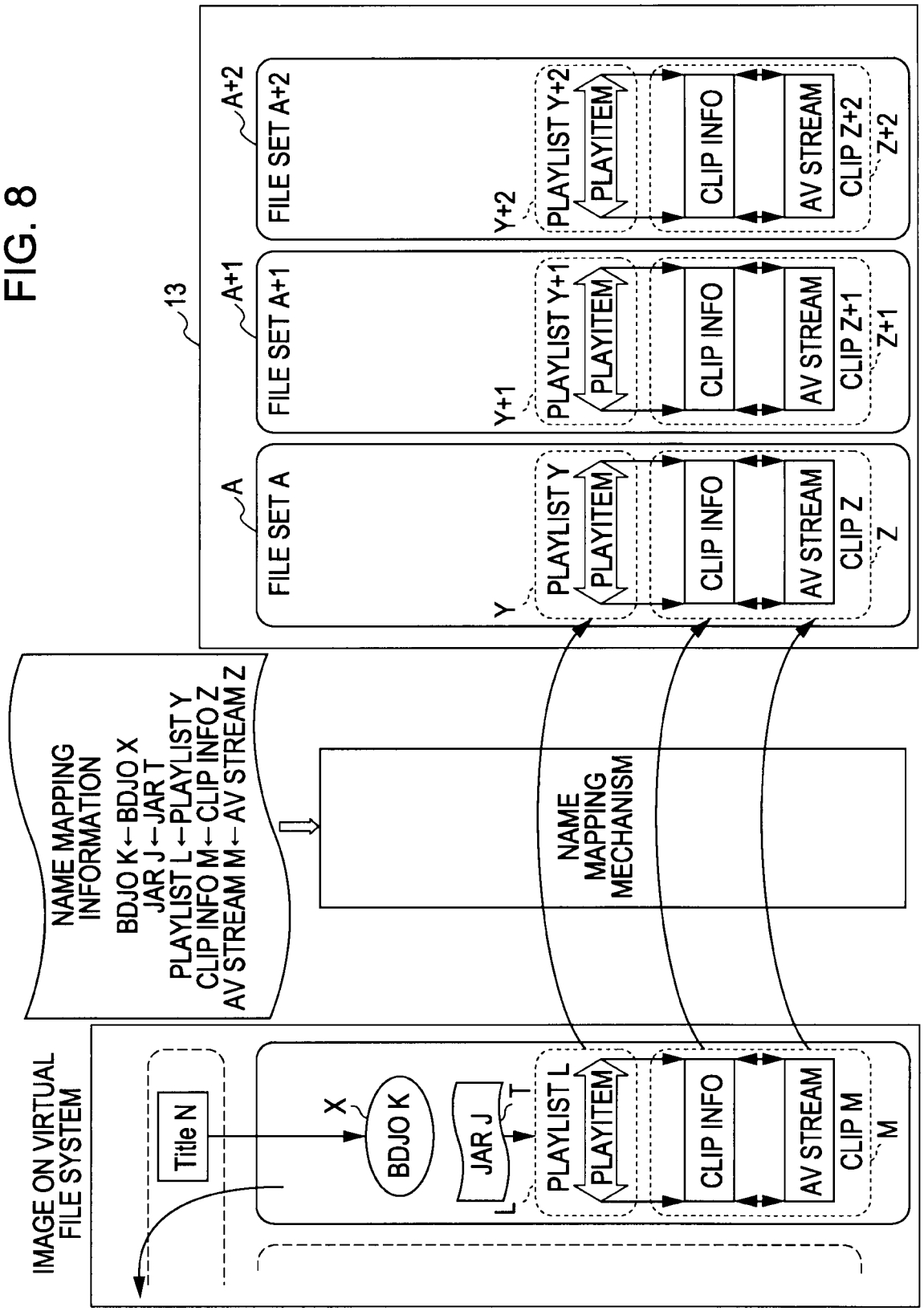

INFORMATION PROCESSING APPARATUS, CONTROL METHOD, CONTROL PROGRAM, AND NAME MAPPING INFORMATION

BACKGROUND OF THE INVENTION

1. Field of the Invention

The present invention relates to an information processing apparatus, a control method, a control program, and name mapping information.

2. Description of the Related Art

Various software data (hereinafter will be referred to as content), such as audio data such as music, image data such as movies, game programs, and various kinds of application programs, can be stored, as digital data, on recording media, for example, a Blu-ray Disc (trademark) with which a blue laser is used, a DVD (Digital Versatile Disc), an MD (Mini Disc), or a CD (Compact Disc). In particular, a Blu-ray disc (hereinafter will be referred to as a BD) with which a blue laser is used is a disc capable of recording data at a high density and can record video content of a large size as high-image-quality data.

There are two types of these various information recording media. One type is a ROM-type medium on which data is recorded in advance and writing of new data is not permitted, and the other type is a data writable medium. It becomes possible for a user, by using a data writable information recording medium, to, for example, receive a digital data broadcast, write received content onto an information recording medium, and play it back.

However, copyright, distribution rights, and the like of most of content, such as broadcast content, music data, and image data, are generally owned by a creator or a seller thereof. Therefore, for distributing this content, in general, such a structure is adopted that a fixed-use limitation is imposed, that is, only an authorized user is permitted to use the content so that it is difficult to perform copying without permission.

According to a digital recording apparatus and a recording medium, for example, recording and playback can be repeatedly performed without deteriorating the quality of images and audio. Distribution of illegally copied content via the Internet, distribution of so-called pirated discs in which content is copied onto a CD-R or the like, and use of illegal content in which the content is stored in a hard disk of a PC or the like cause a problem of the infringement of copyright.

A large-capacity recording medium, such as a DVD or a recording medium using a blue laser whose development has progressed in recent years, can record, on one medium, a large amount of data for, for example, one to several movies, as digital information. As described above, as it has become possible to record video information or the like as digital information, it has become increasingly important to prevent illegal copying and protect copyright holders. Nowadays, in order to prevent such illegal copying of digital data, various technologies have been implemented for digital recording apparatuses and recording media.

For example, if an optical disc, on which content such as a movie is recorded, is purchased, a peripheral device for an optical disc may be used to copy the content n times or a fee may be collected each time a copy is made. As a result of the above, it becomes possible to prevent illegal distribution of content. Also, if a packaged medium on which content is recorded is purchased once, it becomes possible to provide a user with the right to freely view this content to a certain degree by using a device other than a recording and playback device.

When old generated data that is obtained in a late manner from stored information on an information recording medium is to be recorded on a hard disk or the like, a unit key serving as an old generated data encryption key is made to be bind data with key information obtained from an information processing apparatus or with identification information obtained from an information recording medium, is encrypted, and is recorded. As a consequence, when the old generated data is to be used, use of a bind release process becomes necessary. Thus, in the case of device bind, it is necessary that the device be the same device that performed the recording. In the case of disc bind, it is necessary that the same disc used during old generated data recording be loaded. In the case of package bind, use of a disc of the same package ID as the used disc during old generated data recording becomes necessary. Therefore, it is possible to realize use limitation of old generated data in various forms.

As a framework regarding copyright protection of video packaged software recorded on a recording medium, such as an optical disc, AACS (Advanced Access Content System) exists. AACS includes an agreement regarding functions of Managed Copy capable of permitting content recorded on a packaged medium such as an optical disc to be copied to another medium, such as an HDD of a home media server and another loaded optical disc only when a predetermined authentication process is performed and permitting stream distribution to be performed to another connected device via a network.

In order to use the Managed Copy function, it is necessary for the user to be authenticated by a predetermined method from a server that is managed by the distribution source of content.

Here, for the BDs, discs of rewritable (RE) type, recordable (R) type of one-time recording, and read only memory (ROM) type have been standardized.

A BD-ROM has a profile of BD-Live. A player therefor has an execution environment of Java called BD-J, a network connection function via Java, and a virtual file system (VFS) capable of updating the content of a disc in a virtual manner. By controlling these using a program written in BD-J supplied via a disc or supplied via a network, the following can be performed:

New AV content may be added

AV content on a disc may be changed

Navigation may be changed

Here, BD-J (Blu-ray Disc Java) is a platform for interactive content in BD video, which has been developed by the Blu-ray Disc Association. With BD-J, it is possible to download an up-to-date preview through network access, show a video of a filming location, and access a picture-in-picture function and a local storage. A BD player that supports video content is obliged to support BD-J. However, players released during an initial period do not support some functions, such as Internet access, storage access, and picture-in-picture. These functions (from which Internet access is excluded) are called "Bonus View", and functions in which Internet access is included are called "BD-Live". BD-Live is a specification included in BD player profile 2.0, to which a function of downloading additional content from the Internet and an interactive function for games are added.

SUMMARY OF THE INVENTION

In a BD-ROM, as described above, AACS described above is used to protect AV content. This is a technology for encrypting content and concealing an encryption key. In particular, in BD-Live, convenience is increased, for example, an encryption key is tied to a disc medium and an individual player, or temporary playback can be permitted.

As one service of BD-Live, a model in which new content is supplemented one after another is considered. That is, this model is a service model in which content that can be downloaded from the server increases.

However, when content that is downloaded using VFS is added one after another, the playlist, the number of clips, and the like increase each time content is downloaded, presenting the following problems.

It is necessary to design the navigation of content at authoring time. However, because the structure of a disc is changed for each player, authoring becomes difficult.

Furthermore, the configuration of a CPS unit of AACS is changed.

In addition, it is difficult to erase files used in VFS because if erased, the virtual disc structure is destroyed. Consequently, it is not possible to deal with a case in which content is increased one after another and a local storage becomes full.

That is, in the case of service in which new content is downloaded one after another with BD-Live, if the content is added using VFS each time, the local storage becomes full eventually and fails.

It is desirable to prevent a local storage from becoming full and failing in a service in which new content is downloaded one after another with BD-Live.

Further objects and advantages of the present invention will become apparent from the following description of the embodiments.

According to another embodiment of the present invention, there is provided an information processing apparatus including a local storage in which a virtual file system is created, the virtual file system supporting an information recording medium on which encrypted content on which an encryption process has been performed is recorded, the encrypted content being managed for each of content management units serving as content use management units, and on which content management units used by the encrypted content are set; and a playback unit configured to read and play back the encrypted content managed by the content management units used by the encrypted content by using the virtual file system created in the local storage, configured to receive a data distribution file set for linking other information with the encrypted content of the information recording medium, the encrypted content being distributed from an information distribution server, and configured to update the virtual file system using the received data distribution file set, wherein the playback unit supplies, to a name mapping mechanism of the virtual file system, the name mapping information used to, in order that the fixed title is used by a plurality of file sets by using the virtual file system, cause the file set with the fixed title that is to be exchanged with the file set provided in advance in the local storage and used to be replaced with the file set downloaded into the local storage and used.

In the information processing apparatus according to the present invention, the file set that is replaced with the file set with the fixed title and used includes a BD-J object file or a movie object file that is assumed to be used as a BD-J object file or a movie object file, which is referred to by a target title.

In the information processing apparatus according to an embodiment of the present invention, the file set that is replaced with the file set with the fixed title and used may include a JAR file that is assumed to be used as a BD-J program file registered in the BD-J object file, which is referred to by a target title.

In the information processing apparatus according to an embodiment of the present invention, the file set that is replaced with the file set with the fixed title and used may include a playlist file that is assumed to be used as a playlist registered in a BD-J object file or a movie object file, which is referred to by a target title.

In the information processing apparatus according to an embodiment of the present invention, the file set that is replaced with the file set with the fixed title and used may include a clip information file and an AV stream file that are assumed to be used as a clip information file and an AV stream file, which are referred to by a playlist file registered in the BD-J object file or the movie object file, which is referred to by a target title.

According to another embodiment of the present invention, there is provided a method for controlling an information processing apparatus including a local storage in which a virtual file system is created, the virtual file system supporting an information recording medium on which encrypted content on which an encryption process has been performed is recorded, the encrypted content being managed for each of content management units serving as content use management units, and on which content management units used by the encrypted content are set; and a playback unit configured to read and play back the encrypted content managed by the content management units used by the encrypted content by using the virtual file system created in the local storage, configured to receive a data distribution file set for linking other information with the encrypted content of the information recording medium, the encrypted content being distributed from an information distribution server, and configured to update the virtual file system using the received data distribution file set, the method including the steps of: supplying, to a name mapping mechanism of the virtual file system, name mapping information with which a file set with a fixed title to be exchanged with a file set provided in advance in a local storage and used is replaced with a file set downloaded into the local storage and used; and using the fixed title by a plurality of file sets by using the virtual file system.

In the method for controlling an information processing apparatus according to an embodiment of the present invention, the file set that is replaced with the file set with the fixed title and used may include a BD-J object file or a movie object file that is assumed to be used as a BD-J object file or a movie object file, which is referred to by a target title.

In the method for controlling an information processing apparatus according to an embodiment of the present invention, the file set that is replaced with the file set with the fixed title and used may include a JAR file that is assumed to be used as a BD-J program file registered in the BD-J object file, which is referred to by a target title.

In the method for controlling an information processing apparatus according to an embodiment of the present invention, the file set that is replaced with the file set with the fixed title and used may include a playlist file that is assumed to be used as a playlist registered in a BD-J object file or a movie object file, which is referred to by a target title.

In the method for controlling an information processing apparatus according to an embodiment of the present invention, the file set that is replaced with the file set with the fixed title and used may include a clip information file and an AV stream file that are assumed to be used as a clip information file and an AV stream file, which are referred to by a playlist file registered in the BD-J object file or the movie object file, which is referred to by a target title.

According to another embodiment of the present invention, there is provided a control program executed by a computer for controlling an information processing apparatus including a local storage in which a virtual file system is created, the virtual file system supporting an information recording medium on which encrypted content on which an encryption process has been performed is recorded, the encrypted content being managed for each of content management units serving as content use management units, and on which content management units used by the encrypted content are set; and a playback unit configured to read and play back the encrypted content managed by the content management units used by the encrypted content by using the virtual file system created in the local storage, configured to receive a data distribution file set for linking other information with the encrypted content of the information recording medium, the encrypted content being distributed from an information distribution server, and configured to update the virtual file system using the received data distribution file set, the control program including the step of: performing control so that name mapping information with which a file set with a fixed title to be exchanged with a file set provided in advance in a local storage and used is replaced with a file set downloaded into the local storage and used is supplied to a name mapping mechanism of the virtual file system, and the fixed title is used by a plurality of file sets by using the virtual file system.

In the control program for an information processing apparatus according to an embodiment of the present invention, the file set that is replaced with the file set with the fixed title and used may include a BD-J object file or a movie object file that is assumed to be used as a BD-J object file or a movie object file, which is referred to by a target title.

In the control program for an information processing apparatus according to an embodiment of the present invention, the file set that is replaced with the file set with the fixed title and used may include a JAR file that is assumed to be used as a BD-J program file registered in the BD-J object file, which is referred to by a target title.

In the control program for an information processing apparatus according to an embodiment of the present invention, the file set that is replaced with the file set with the fixed title and used may include a playlist file that is assumed to be used as a playlist registered in a BD-J object file or a movie object file, which is referred to by a target title.

In the control program for an information processing apparatus according to an embodiment of the present invention, the file set that is replaced with the file set with the fixed title and used may include a clip information file and an AV stream file that are assumed to be used as a clip information file and an AV stream file, which are referred to by a playlist file registered in the BD-J object file or the movie object file, which is referred to by a target title.

According to another embodiment of the present invention, there is provided name mapping information that is supplied to a name mapping mechanism of a virtual file system of an information processing apparatus including a local storage in which the virtual file system is created, the virtual file system supporting an information recording medium on which encrypted content on which an encryption process has been performed is recorded, the encrypted content being managed for each of content management units serving as content use management units, and on which content management units used by the encrypted content are set; and a playback unit configured to read and play back the encrypted content managed by the content management units used by the encrypted content by using the virtual file system created in the local storage, configured to receive a data distribution file set for linking other information with the encrypted content of the information recording medium, the encrypted content being distributed from an information distribution server, and configured to update the virtual file system using the received data distribution file set, and with which name mapping information, in order to use the fixed title by a plurality of file sets by using the virtual file system, the file set with the fixed title to be exchanged with the file set provided in advance in the local storage and used is replaced with the file set downloaded into the local storage and used.

In the name mapping information according to an embodiment of the present invention, the file set that is replaced with the file set with the fixed title and used may include a BD-J object file or a movie object file that is assumed to be used as a BD-J object file or a movie object file, which is referred to by a target title.

In the name mapping information according to an embodiment of the present invention, the file set that is replaced with the file set with the fixed title and used may include a JAR file that is assumed to be used as a BD-J program file registered in the BD-J object file, which is referred to by a target title.

In the name mapping information according to an embodiment of the present invention, the file set that is replaced with the file set with the fixed title and used may include a playlist file that is assumed to be used as a playlist registered in a BD-J object file or a movie object file, which is referred to by a target title.

In the name mapping information according to the present invention, the file set that is replaced with the file set with the fixed title and used may include a clip information file and an AV stream file that are assumed to be used as a clip information file and an AV stream file, which are referred to by a playlist file registered in the BD-J object file or the movie object file, which is referred to by a target title.

According to the present invention, by reusing one title by a plurality of content sets, only the content that is being actually played back is mounted in a virtual file system. Therefore, in a service in which new content is downloaded one after another with BD-Live, it does not occur that a local storage becomes full and fails.

BRIEF DESCRIPTION OF THE DRAWINGS

FIG. 6 shows a disc image of content in a local storage with an information processing layer in the information distribution system;

FIG. 7 illustrates a case in which a file set (File Set A+1) downloaded from the information distribution server is used in the information distribution system; and FIG. 8 illustrates a case in which a file set (File Set A) of only a playlist and a clip downloaded from the information distribution server is used in the information distribution system.

DESCRIPTION OF THE PREFERRED EMBODIMENTS

Embodiments of the present invention will be described in detail below. The present invention is not limited to examples described below, and can of course be changed as desired within the gist and scope of the present invention.

Figure 1:
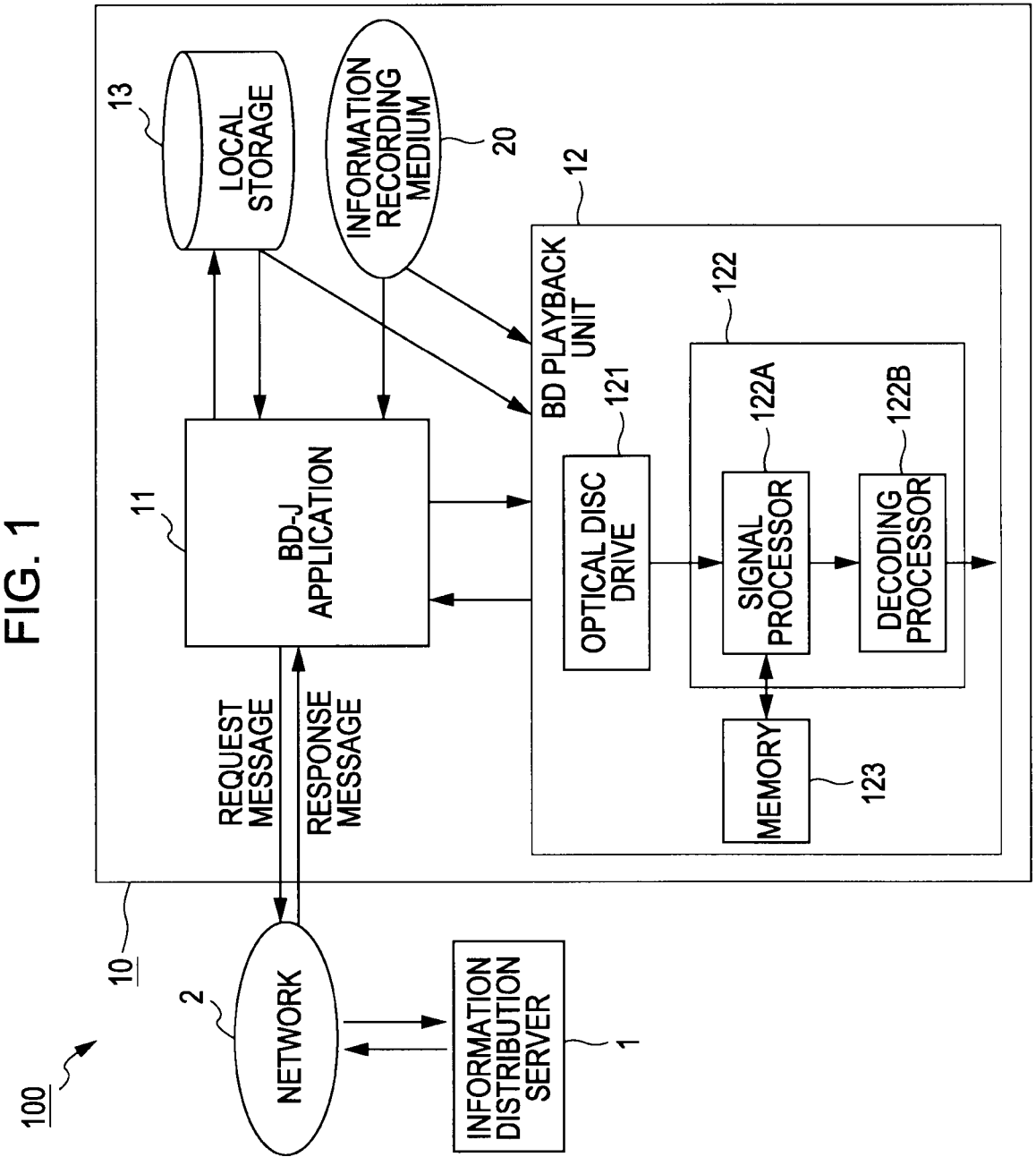
FIG. 1 is a block diagram showing an example of the configuration of an information distribution system to which an embodiment of the present invention is applied.

The present invention is applied to, for example, an information distribution system 100 of the configuration shown in FIG. 1.

The information distribution system 100 includes an information distribution server 1 for providing old generated data, and an information processing apparatus 10 connected to the information distribution server 1 via a network 2, such as the Internet, so that an online system based on the information distribution server 1, a BD-ROM application system formed of modules of a BD-J application 11 installed onto the information processing apparatus 10 and a BD playback unit 12, and AACS is created.

The information distribution server 1 is a server for providing old generated data, performs a communication process in accordance with a predetermined sequence with the information processing apparatus 10, and transmits, to the information processing apparatus 10 via the network 2, encrypted subcontent serving as old generated data, use permission information for the old generated data, and a CPS unit key file serving as encryption key information applied to the old generated data. The information processing apparatus 10 stores these data in a local storage 13, such as, for example, a hard disk, whereby the data is kept.

The information processing apparatus 10 is available in various information processing apparatuses, such as, for example, a personal computer or a play-dedicated device, and is installed with the BD-J application 11, the BD playback unit 12 for performing a process for reading data from the information recording medium 20, and the local storage 13 formed of a hard disk drive.

The BD-J application 11 accesses the information distribution server 1 in accordance with a general protocol, such as HTTP, sends a request message, and receives a response message. These messages can be recorded as a clip AV stream file, a CPS unit key file, and a CPS unit use file, in the local storage 13.

Examples of files read from the local storage 13 and the information recording medium 20 by the BD-J application 11 include a database file and a clip AV stream file, which are defined by an AV format.

The BD-J application 11, when information related with an AACS layer is necessary, calls an AACS layer and receives a response message therefrom. These messages serve as APIs (Application Program Interfaces) between the BD-J application 11 and the AACS layer.

Then, by using these APIs, the BD-J application 11 requests the AACS layer to perform processes for implementing functions of permission and binding. These processes are used in only the AACS layer to decrypt a clip AV stream file and to control playback based on a use rule defined in a CPS unit use file.

At this point, in the information distribution system 100, the information recording medium 20 is an information recording medium, such as, for example, a Blu-ray disc or a DVD, and is an information recording medium on which valid content is stored, which is manufactured in a disc manufacturing factory under the permission of a so-called content right holder having a valid content copyright or distribution rights. In the following embodiment, a description will be given by using, as an example, a disc-type medium as an example of an information recording medium. However, the present invention can be applied to a configuration in which information recording media having various forms are used.

The following are stored on the information recording medium 20: encrypted content on which an encryption process has been performed, an MKB (Media Key Block) as an encryption key block generated on the basis of the key distribution method of a tree structure known as one form of a broadcast encryption method, a volume ID set as identification information for each information recording medium in units of manufacture, a package ID set as identification information in units of a content title, a content owner, a studio, and the like, use permission information including CCI (Copy Control Information) serving as copy/playback control information for content, a CPS unit key file storing CPS unit keys that are encryption keys set for each content management unit (CPS unit) as a content use management unit, a serial number that is set, as an individual number, to an individual information recording medium 20, and download information, such as the address of the server from which the old generated data was obtained.

Figure 2:
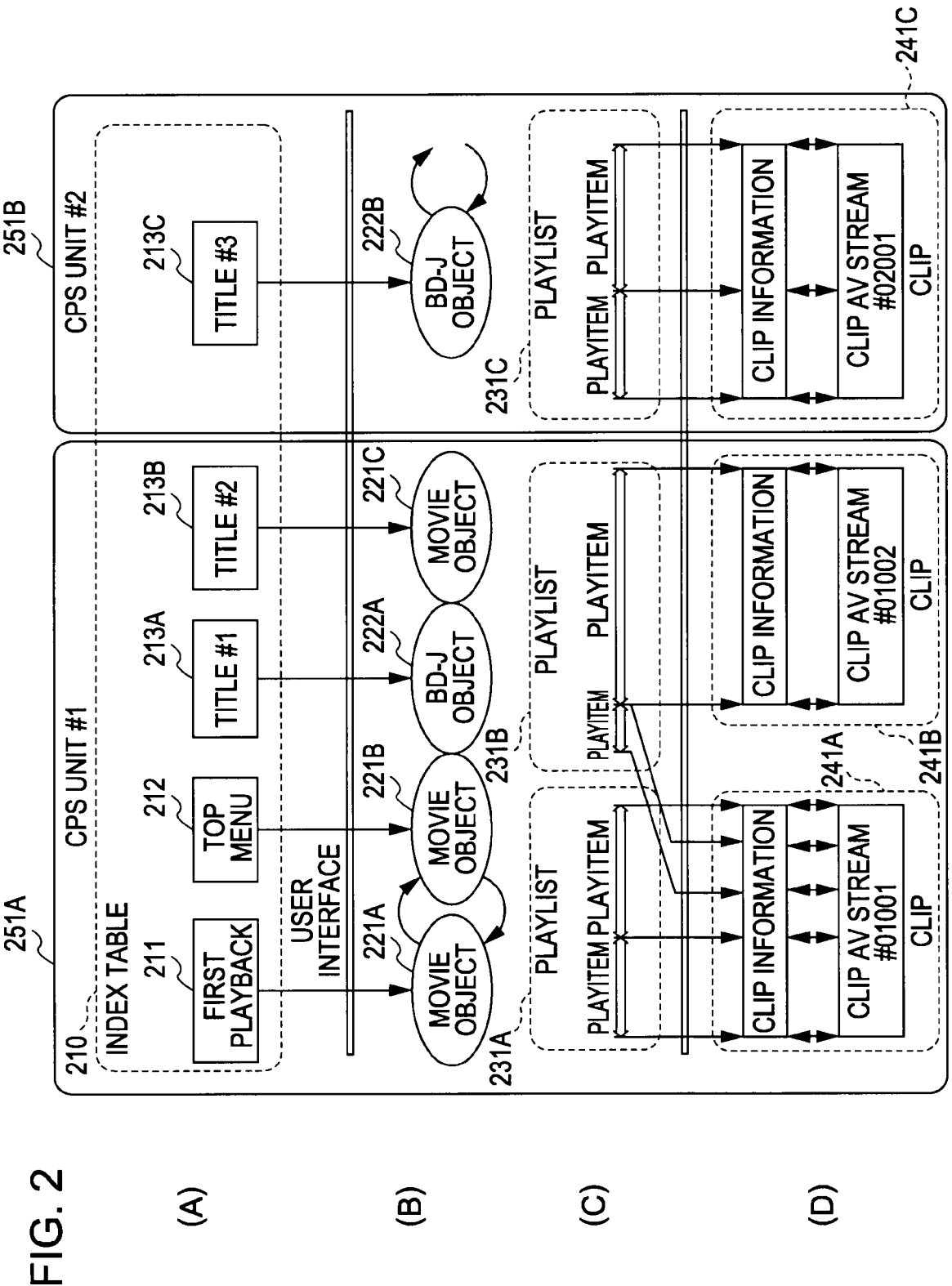
FIG. 2 shows an example of an application format in the information distribution system.

Here, the application format in the information distribution system 100 has, for example, a four hierarchical structure of (a) an index table, (b) movie objects, (c) playlists, and (D) clips, as shown in FIG. 2.

In the information distribution system 100, each pair of an AV stream and its attributes is one object. A clip (Clip) 241 (241A, 241B, 241C) is an object formed of a clip AV stream (Clip AV stream) file and a clip information (Clip Information) file corresponding thereto.

A clip AV stream file basically stores data of MPEG2 transport streams. A clip information file stores time stamps of access points to corresponding AV streams.

The BD playback unit 12 finds a start point of reading data from the AV stream and reads clip information (Clip Information).

A playlist (Playlist) 231 (231A, 231B, 231C) is a set of information indicating a playback section within a clip 241 (241A, 241B, 241C). Information indicating one playback section within a particular AV stream is called a playitem (Playitem). The playitem is represented by a pair of an IN point (playback start point) and an OUT point (playback end point) of the playback section in the time axis.

A movie object (Movie Object) 221 (221A, 221B, 221C) is formed of a navigation command program. The movie object 221 (221A, 221B, 221C) is in a hierarchy higher than the playlist 231 (231A, 231B, 231C). The navigation command in the movie object 221 (221A, 221B, 221C) makes it possible to send a playback playlist and also call another movie object. As a result, the set of movie objects makes it possible to manage playlists in accordance with coordination and selection of the user.

A BD-J object (BD-J Object) 222 (222A, 222B) is formed of a BD-J application table, and represents a BD-J application set. Furthermore, the JAVA (registered trademark) programming environment enables the playback of content that mutually acts with a dynamic scenario representation. The BD-J object 222 (222A, 222B) is in the same hierarchy as the movie object 221 (221A, 221B, 221C), and is selected for each title. The BD-J application registered in the BD-J object provides an online function to not only the corresponding title but also the entire BD-ROM disc.

An index table 210 has the highest information of the application format, and is formed of entry points of first playback (First Playback) 211, a top menu (Top Menu) 212, and all the titles (Title) 213A, 213B, and 213C.

The BD playback unit 12 refers to this table whenever an operation necessary for the first playback 211, the top menu 212, and playback of each of the titles 213A, the 213B, and the 213C is performed.

The first playback (First Playback) 211 can be defined as desired in the index table 210, and indicates a movie object or a BD-J object that is automatically played back when the information recording medium 20 is loaded into the BD playback unit 12. The first playback 211 in this example shows a movie object (Movie Object) 221A.

When the information recording medium 20 is loaded, the BD playback unit 12 refers to the entry of the first playback 211 and obtains the corresponding movie object or BD-J object. That is, the BD playback unit 12 in this example obtains a movie object 221A by referring to the entry of the first playback 211.

The top menu 212 can be selectively defined in the index table 210 and shows a movie object or a BD-J object. This is called up by user operation like "menu calling". The movie object tied by the top menu 212 branches to another movie object as a submenu.

The title (Title) 213 (213A, 213B, 213C) is a logical unit for the user to recognize it as one playback group. This group can be made to be one linear playback or non-linear playback having a branch point. Each title has a title number. The title numbers are defined in an ascending order starting from 1. All the title numbers are smaller than the total number of titles and are defined at least once on an information recording medium.

A CPS unit (CPS Unit) 251 (251A, 251B) is a group of first playback, the top menu, and/or titles, which are decrypted using the same unit key (Kcu).

Each of the CPS units 251A and 251B has a CPS use file corresponding thereto. Each of the CPS units 251A and 251B has a CPS unit number. The CPS unit number values are defined in an ascending order starting from 1. Therefore, the maximum value of the CPS unit number is the same as the number of CPS units assigned to the first playback, the top menu, and/or the titles. All the CPS unit numbers from 1 to the maximum CPS unit number are used at least once.

All the AV stream files that are referred to by the first playback are contained in the same CPS unit and are decrypted using the same unit key.

All the AV stream files that are referred to by the top menu are contained in the same CPS unit and are decrypted using the same unit key.

All the AV stream files that are referred to by one title are contained in the same CPS unit and are decrypted using the same unit key.

The first playback, the top menu, and/or the titles usually share one or more clips contained in the same CPS unit.

The unit key is assigned to the first playback, the top menu, and/or the title.

Multiple titles share one or more clips. These titles are contained in the same CPS unit, and the same unit key is assigned to these titles.

The first playback may be or may not be contained in the same CPS unit having the top menu, one or plural titles.

The top menu may be or may not be contained in the same CPS unit having one or plural titles.

In the example of FIG. 2, two CPS units 251A and 251B are shown. The first playback 211, the top menu 212, and the titles 213A and 213B refer to the same clip AV stream #01001 (clip 241A) and therefore, they belong to the same CPS unit 251A. The clip AV stream #01001 of the clip 241A and the clip AV stream #01002 of the clip 241B are decrypted using the same key Kcu1.

Then, in the BD-ROM application format, different keys are assigned to different CPS units in order to ensure high security and flexibility for the future.

For example, in the example of FIG. 2, different keys Kcu1 and Kcu2 are assigned to the CPS unit 251A and the CPS unit 251B. In this example, switching between the two CPS units 251A and 251B can be performed using a command for changing a jump title or a call title.

The BD-ROM application format includes the concept of a virtual package. By using this concept, content downloaded into the local storage 13, such as a hard disk, and content recorded in advance in a BD-ROM are concatenated as one virtual package. The downloaded file contains not only a content file but also a file for copy protection, for example, a CPS unit key file recorded in the AACS directory.

Figure 3:
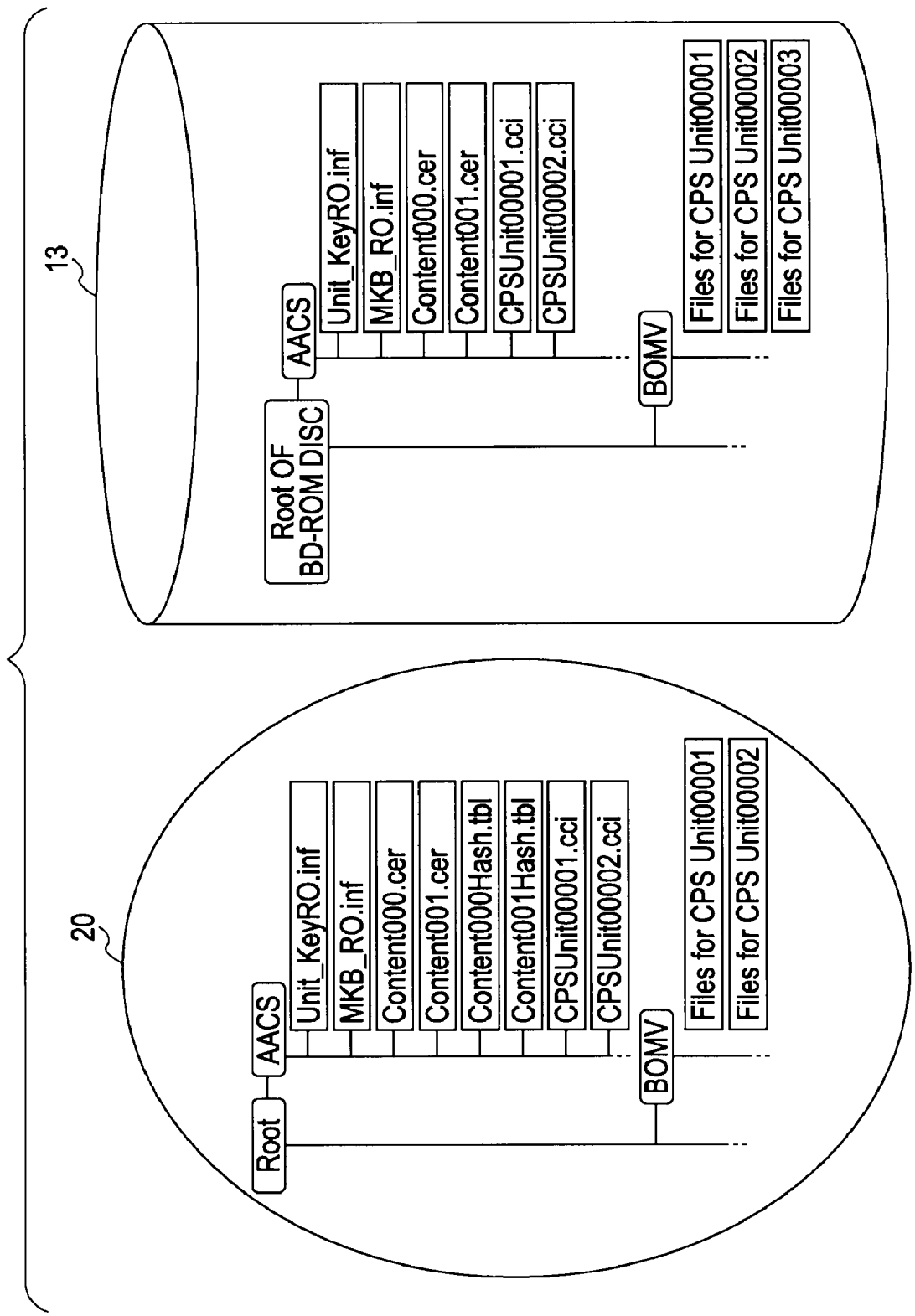
FIG. 3 shows the concept of a virtual file system in the information distribution system.

Here, the concept of the virtual file system for filing in the AACS directory and the BDMV directory is shown in FIG. 3.

In the example shown in FIG. 3, a CPS unit 251A and a CPS unit 251B are recorded from the root of the information recording medium 20. A downloaded file is recorded in a specific area of the local storage 13 associated with the information recording medium 20. In this example, the content to be downloaded is a file that is updated for the CPS unit 251A and the CPS unit 251B shown in FIG. 4, and new content for the CPS unit 251C.

Figure 4:
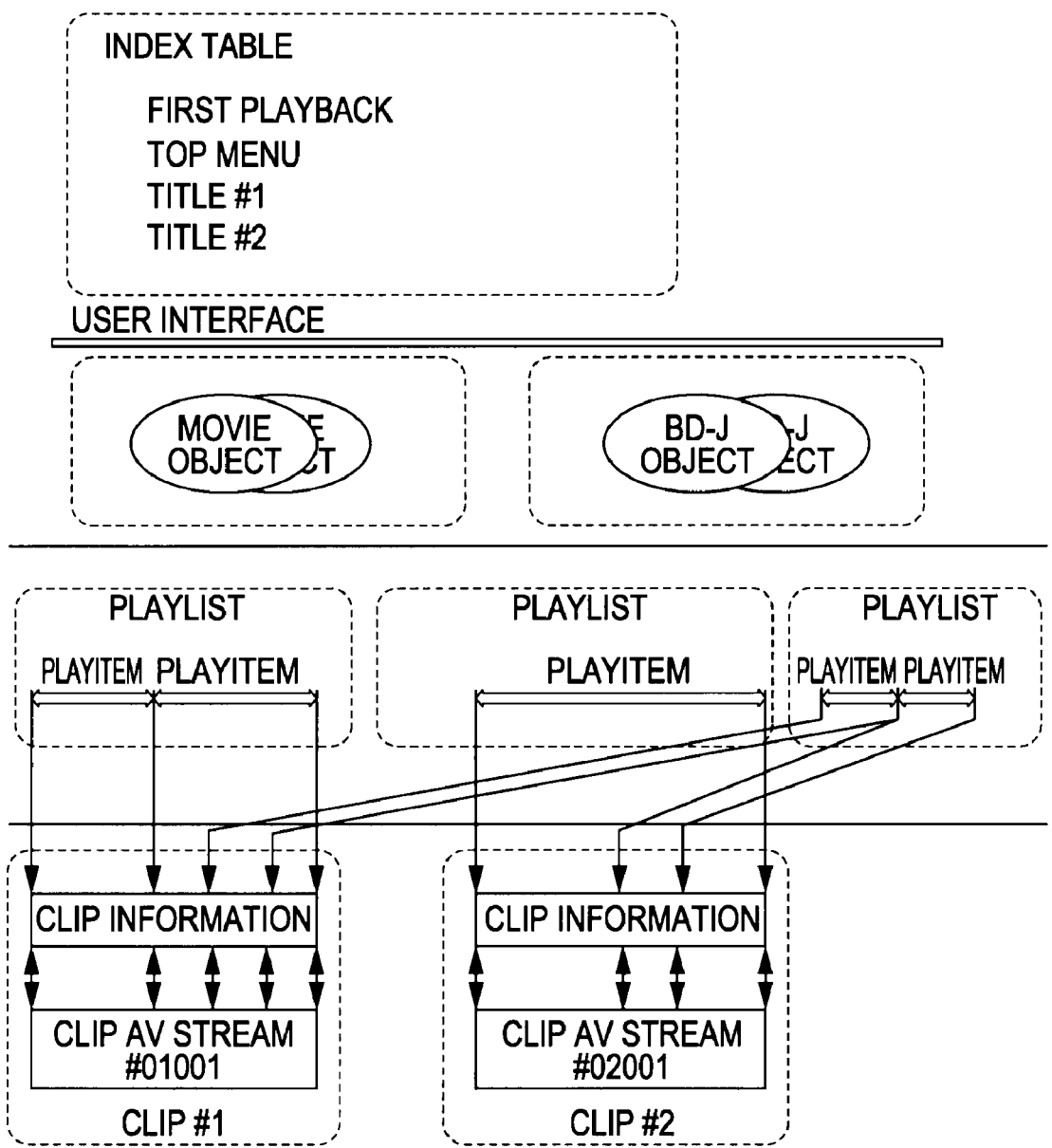
FIG. 4 shows an application format in the information distribution system.

In FIGS. 3 and 4, a partial update of the CPS unit 251A and the CPS unit 251B and new addition of the CPS unit 251C are shown. The details of the AV application are omitted.

Figure 5:
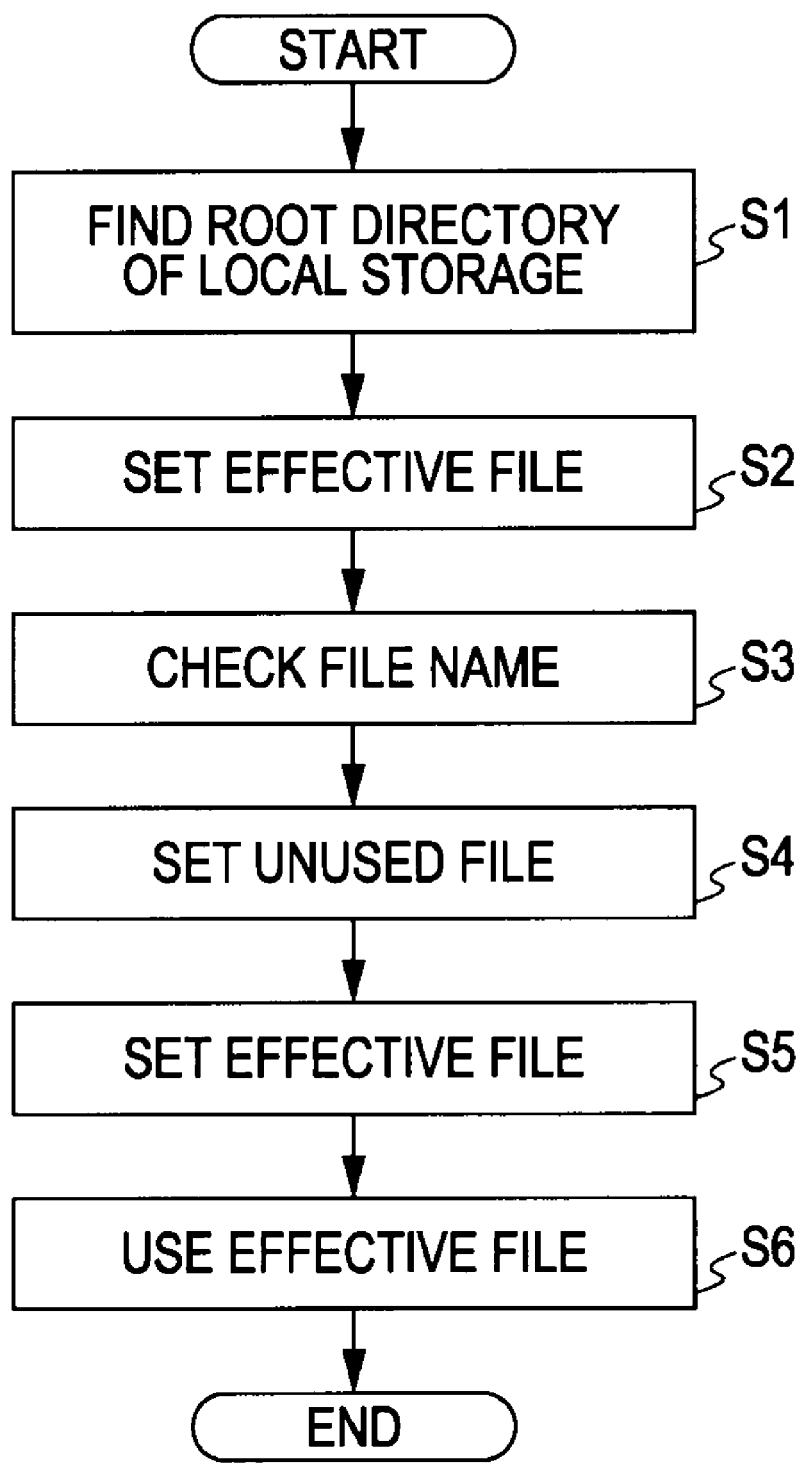
FIG. 5 is a flowchart showing the operation of a BD playback unit in the information distribution system.

For files in the AACS directory, the BD playback unit 12, in accordance with the procedure shown in the flowchart in FIG. 5, connects the file on the information recording medium 20 with the file in the local storage 13.

That is, in step S1, when the information recording medium 20 is loaded into the BD playback unit 12, the root directory of the local storage 13 for the information recording medium 20 is found.

In the next step S2, an AACS-related file to be concatenated in the local storage 13 is found in accordance with the connection instruction given in advance. The file name after all the files are concatenated is checked and also, is set as an effective file.

In the next step S3, files in the AACS directory of the information recording medium 20 are found, and those file names are checked.

In the next step S4, in the case that the file name found in the above step S3 has already been found in the above step 2, the file is set as an unused file of the information recording medium 20.

In the next step S5, in the case that the file name found in the above step S3 has not been found in the above step 2, the file is set as an effective file of the information recording medium 20.

In the next step S6, all the effective files are used for the virtual file system. Files contained in the CPS unit, for example, a BD-J object file, a movie object file, a BD-J program file, a playlist file, a clip information file, and an AV stream file, are concatenated after undergoing identical processing. However, the details thereof omitted herein.

Here, in the virtual file system shown in FIG. 3, the CPS unit key file is updated in this example. The CPS unit key file in the information recording medium 20 has an encryption key for the CPS unit 251A and the CPS unit 251B. The CPS unit key file in the local storage 13 has all the encryption keys for the CPS unit 251A, the CPS unit 251B, and the CPS unit 251C. As a consequence, the CPS unit key file in the local storage 13 has all the encryption keys necessary to play back all the content in the virtual file system.

An MKB (Media Key Block) can be updated by a download function. For example, when the MKB in the information recording medium 20 is not an up-to-date one, it is possible for the device to obtain a new MKB from the server during the download process. In this case, the encryption key data in the CPS unit key file to be downloaded has been encrypted using the medium key that can be generated using the new MKB.

In the case of this example, a content certificate is updated in parallel with the update of the CPS unit use file. The content certificate has a hash value of the CPS unit use file. The content certificate is necessary to be updated when each CPS unit use file is updated.

The CPS unit use file for the CPS unit that is newly downloaded is added during the download process.

Then, the CPS unit use file in the information recording medium 20 can be used as long as it is not for CPS unit use that is changed during the download process in accordance with the intent of the content parties concerned. In this case, the CPS unit use file in the information recording medium 20 is updated during the download process. A new CPS unit use file having the same file name is downloaded into the local storage 13 and is effectively set.

Here, a disc image of content in the local storage 13 is shown in FIG. 6.

In the disc image shown in FIG. 6, org_id that divides the directory is an identifier used to create a virtual file system in a corresponding optical disc. Disc_id is an identifier used to identify individual content associated with the same org_id, and is used to create a virtual file system in the corresponding information recording medium 20 in the same manner as for org_id.

Org_id may be provided for each organization or party, such as, for example, the distribution source of content or the manufacturing source of content. One org_id may be used in these plural organizations or parties. Each of these organizations or parties may use a plurality of org_id. Disc_id has one-to-one correspondence with the information recording medium 20.

A directory and files can be freely arranged below disc_id, and the names thereof can be freely set. In FIG. 6, in order to facilitate understanding, the same name as the name in the information recording medium is used. For this reason, a directory in which the name of "BDMV" is set is provided below disc_id. The BDMV directory is provided with a directory (PLAYLIST directory) in which the name of "PLAYLIST" is set, a directory (CLIPINF directory) in which the name of "CLIPINF" is set, and a directory (STREAM directory) in which the name of "STREAM" is set.

In the PLAYLIST directory, playlist files are stored. A playlist file is named with a name such that an extension ".mpls" is attached to a file name of a 5-digit numeral.

Clip information files are stored in the CLIPINF directory. Each clip information file is named with a name such that an extension ".clpi" is attached to a file name of a 5-digit numeral.

Furthermore, in the STREAM directory, clip AV stream files and substream files are stored. Each stream file is named with a name such that an extension ".m2ts" is attached to a file name of a 5-digit numeral.

In the information distribution system 100, in the manner described above, the encrypted content stored on the information recording medium 20 has been encrypted by using an encryption key for individual CPS units that are set as content management units. AV (Audio Visual) streams, music data, image data such as moving images and still images, and the like, which constitute content, have been divided into CPS units as management units for content use. It is necessary for the information processing apparatus 10 that performs a playback process to identify a CPS unit to which content to be played back belongs and to perform a decoding process using a CPS unit key serving as an encryption key corresponding to the identified CPS unit. A file storing data necessary to obtain the CPS unit key is a CPS unit key file.

The BD playback unit 12 installed on the information processing apparatus 10 includes an optical disc drive 121 for reading data stored on the information recording medium 20, a playback processor 122 to which data read by the optical disc drive 121 is supplied, and a memory 123 in which various kinds of information necessary for a playback process by the playback processor 122 are stored.

The playback processor 122 has a decoding processor 122A for performing a process for decrypting encrypted content, and a decoding processor 122B for performing a decoding (for example, MPEG decoding) process. In the decoding processor 122A, a key used to decrypt content is generated by using various kinds of information stored in the memory 123 and data read from the information recording medium 20, and a process for decrypting encrypted content is performed. Furthermore, in the playback processor 122, a process for decrypting old generated data stored in the local storage 13 is also performed. For example, a process for reading movie content from the information recording medium 20 and decoding the movie content is performed. Also, a process for performing decryption of subtitles data serving as encrypted old generated data from the local storage 13 and reproducing the subtitles data is performed.

A device key Kd is stored in the memory 123. The device key Kd is a key used for the above-described processing of MKB. An MKB is a key information block that enables a medium key [Km] that is a key necessary for decrypting content to be obtained by only a process (decoding) based on a device key [Kd] stored in the information processing apparatus 10 of a user having a valid license. For decrypting encrypted content, the BD playback unit 12 performs processing of MKB by using the device key Kd stored in the memory 123.

Regarding content stored on the information recording medium 20 as described above, in order to realize use control different for each unit, a key different for each unit is assigned, is subjected to an encryption process, and is stored. That is, content is divided into content management units (CPS units), individual encryption processes are performed, and individual use management is performed. That is, content stored in advance on the information recording medium 20 is structured in such a manner that content is divided into CPS units, is stored as encrypted data using a unit key corresponding to each unit, and is subjected to use control based on use permission information corresponding to each CPS unit. Use management by a CPS unit is also possible for content other than content stored in advance on the information recording medium 20, for example, old generated data, such as data generated by the user in a late manner and data obtained from the outside.

For using content, first, it is necessary to obtain a CPS unit key assigned to each unit. Furthermore, data processing based on a predetermined decoding processing sequence is performed by using another necessary key, key generation information, and the like, and playback is performed.

In the information processing apparatus 10, old generated data is stored in the local storage 13, such as a hard disk, and is used. The local storage 13 is not limited to a hard disk, and may be a removable medium, such as a card memory of flash memory type or a data-writable DVD.

In the information processing apparatus 10, old generated data obtained from the information distribution server 1, for example, old generated data (encrypted subcontent), such as subtitles data corresponding to movie content, is also set as data belonging to a CPS unit.

The old generated data stored in the local storage 13 is also used under predetermined use control management similarly to content corresponding to CPS-unit-compliant content, which has already been stored in advance on the information recording medium 20. For example, the old generated data is prevented from being copied on an external storage medium and illegally used by a third party not having a use right of content.

That is, when using old generated data stored in the local storage 13, similarly to the CPS-unit-compliant content stored on the information recording medium 20, the old generated data is used in accordance with use limitation of use permission information corresponding to the CPS unit to which old generated data belongs. Furthermore, it is necessary to obtain a CPS unit key that is set in such a manner as to correspond to old-generated-data-compliant CPS unit and to decrypt encrypted data serving as old generated data.

There are cases in which the CPS unit for old generated data is set as a new CPS unit, and is set as a CPS unit that has been set in the information recording medium 20.

As described above, the old generated data is concatenated with a file in the information recording medium 20 by the virtual file system. At this time, in order to maintain the integrity of playback data, the BD playback unit 12 is made to access only a file after being concatenated by the virtual file system. That is, it is necessary that all the old generated data to be played back is concatenated by the virtual file system. However, when downloaded content is added by using the virtual file system in the manner described above, playlists and clips increase each time, and eventually the local storage becomes full and fails. Accordingly, in the information distribution system 100, one title is reused by using the virtual file system in the following manner.

That is, for example, as shown in FIGS. 7 and 8, a title (Title N) to be exchanged with a file set in the local storage 13 and used is provided in advance. Then, in the local storage 13, a plurality of file sets that are used by being interchanged with the title (Title N) are provided by, for example, downloading them. In the example shown in FIGS. 7 and 8, a file set (File Set A), a file set (File Set A+1), and a file set (File Set A+2) are downloaded from the information distribution server 10.

A file set contains a BD-J object file (BD-J Object File) or a movie object file (Movie Object File), which is used in the title.

In the case of a BD-J object file, a BD-J program file (Jar File), a playlist file (PlayList File), a clip information file (Clip Info File), and an AV stream file (AV Stream File) are contained.

Then, the number of the image in the virtual file system is fixed, and the file set is used by being interchanged in the title provided for exchange purposes by using the name mapping mechanism 15 of the virtual file system.

In one of the levels described below,
BD-J object file or movie object file,
BD-J program file in the case of BD-J title,
playlist file, and
Clip information files and AV stream files, files having the same number are interchanged and reused.

The reference target of the files below the highest order file, which are reused, can be freely changed by interchanging high-order files. As a consequence, reuse is not necessarily necessary. However, basically, interchanging the files to be used is easier to implement because the structure of the disc is not changed.

Depending on an application, there is a case in which all the files below the highest order file that is reused are not necessarily necessary.

For example, in a case where a file set (File Set A+1) is to be used, as shown in FIG. 7, by giving instructions to the name mapping mechanism 15 of the virtual file system that BDJO X+1, JAR T+1, playlist Y+1, clip information Z+1, and AV stream Z+1 of a file set (File Set A+1) be set as BDJO K, JAR J, a playlist L, clip information M, and an AV stream M of the title N, interchange with the file set (File Set A+1) is performed in the title (Title N), and access to an entity is performed.

For example, as shown in FIG. 8, in a case where the file set (File Set A), the file set (File Set A+1), and the file set (File Set A+2), which are downloaded from the information distribution server 10, are a BD-J program file, a playlist file, and a clip, and the file set (File Set A) is to be used, by giving instructions to the name mapping mechanism 15 of the virtual file system that the JAR T, the playlist Y, the clip information Z, and the AV stream Z of the file set (File Set A) be set as JAR J, a playlist L, clip information M, and an AV stream M of the title N, interchange with the file set (File Set A) is performed in the title (Title N), and access to the entity is performed.

As described above, in the information distribution system 100, in order that the fixed title (Title N) is used by a plurality of file sets by using the virtual file system, name mapping information with which a file set with a fixed title to be exchanged with a file set provided in advance in the local storage and used is replaced with a file set downloaded into the local storage 13 and used is supplied to the name mapping mechanism 15 of the virtual file system of the information processing apparatus 10. The information processing apparatus 10 includes the local storage 13 in which a virtual file system is created, the virtual file system supporting an information recording medium 20 on which encrypted content on which an encryption process has been performed is recorded, the encrypted content being managed for each of content management units serving as content use management units, and on which content management units used by the encrypted content are set; and the BD playback unit 12 configured to read and play back the encrypted content managed by the content management units used by the encrypted content by using the virtual file system created in the local storage 13, configured to receive a data distribution file set for linking other information with the encrypted content of the information recording medium 20, the encrypted content being distributed from an information distribution server, and configured to update the virtual file system using the received data distribution file set.

In the information distribution system 100, name mapping information with which a file set with a fixed title (Title N) to be exchanged with a file set provided in advance in the local storage 13 and used is replaced with a file set downloaded into the local storage 13 and used, so that the fixed title (Title N) is used by a plurality of file sets by using the virtual file system, is supplied to the name mapping mechanism 15 of the virtual file system of the information processing apparatus 10. The information processing apparatus 10 includes the local storage 13 in which a virtual file system is created, the virtual file system supporting an information recording medium 20 on which encrypted content on which an encryption process has been performed is recorded, the encrypted content being managed for each of content management units serving as content use management units, and on which content management units used by the encrypted content are set; and the BD playback unit 12 configured to read and play back the encrypted content managed by the content management units used by the encrypted content by using the virtual file system created in the local storage 13, configured to receive a data distribution file set for linking other information with the encrypted content of the information recording medium 20, the encrypted content being distributed from the information distribution server 1, and configured to update the virtual file system using the received data distribution file set.

The information processing apparatus 10 in the information distribution system 100 causes the installed computer to provide, to the name mapping mechanism 15 of the virtual file system, name mapping information with which a file set with a fixed title (Title N) to be exchanged with the file set provided in advance in the local storage 13 and used is replaced with the file set downloaded into the local storage 13, and executes a control program for performing control so that the fixed title (Title N) is used by a plurality of file sets by using the virtual file system.

That is, the information processing apparatus 10 in the information distribution system 100 includes the local storage 13 in which a virtual file system is created, the virtual file system supporting an information recording medium 20 on which encrypted content on which an encryption process has been performed is recorded, the encrypted content being managed for each of content management units serving as content use management units, and on which content management units used by the encrypted content are set; and the BD playback unit 12 configured to read and play back the encrypted content managed by the content management units used by the encrypted content by using the virtual file system created in the local storage 13, configured to receive a data distribution file set for linking other information with the encrypted content of the information recording medium 20, the encrypted content being distributed from an information distribution server, and configured to update the virtual file system using the received data distribution file set. The BD playback unit 12 supplies, to the name mapping mechanism 15 of the virtual file system, name mapping information with which a file set with a fixed title (Title N) to be exchanged with a file set provided in advance in the local storage 13 and used is replaced with the file set downloaded into the local storage 13 and used, so that the fixed title (Title N) is used by a plurality of file sets by using the virtual file system.

As described above, if only a part (file set) that is desired to be immediately played back is concatenated with one title (Title N) by using the virtual file system and a part that is not necessary to be immediately played back is not concatenated, it becomes possible to, for example, move a file that is not concatenated to another place or to once more download a file that has been deleted once when necessary. That is, as a result of reusing one title (Title N) by using the virtual file system, in a service in which new content is downloaded one after another with BD-Live, a local storage is prevented from becoming full and failing. Furthermore, since the same title (Title N) is reused, it is possible to prevent the structure of content after concatenation from being changed. That is, it can be prevented that, for example, navigation is re-designed or the configuration of CPS units of AACS is changed.

The present application contains subject matter related to that disclosed in Japanese Priority Patent Application JP 2008-118927 filed in the Japan Patent Office on Apr. 30, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents hereof.

What is claimed is:

1. An information processing apparatus, comprising:
    a local storage in which a virtual file system is created, the virtual file system supporting an information recording medium on which encrypted content, with respect to which an encryption process has been performed, is recorded, the encrypted content being managed for each of content management units serving as content use management units, and on which content management units used by the encrypted content are set; and
    a playback unit, implemented by a hardware processor, configured to read and play back the encrypted content managed by the content management units used by the encrypted content by using the virtual file system created in the local storage, configured to receive a data distribution file set for linking other information with the encrypted content of the information recording medium, the encrypted content being distributed from an information distribution server, and configured to update the virtual file system using the received data distribution file set,
    wherein the playback unit supplies, to a name mapping mechanism of the virtual file system, name mapping information specifying a file set associated with a fixed title, the file set to be exchanged with a file set provided in advance in the local storage, the file set being replaced with a file set downloaded into the local storage and used, so that the fixed title is used by a plurality of file sets by using the virtual file system, and
    each of a Blue-ray Disc Java object file, a Blue-ray Disc program file, a playlist file, a clip information file, and an audio-visual stream file in the data distribution file set are individually mapped to corresponding virtual file system names associated with the fixed title, when the data distribution file set is to be used.

2. The information processing apparatus according to claim 1, wherein the file set that replaces the file set with the fixed title includes a Blu-ray disc Java object file or a movie object file, which is referred to by a target title.

3. The information processing apparatus according to claim 1, wherein the file set that replaces the file set with the fixed title includes a Java Archive file that is to be used as a Blu-ray disc Java object file program file registered in a Blu-ray disc Java object file, which is referred to by a target title.

4. The information processing apparatus according to claim 1, wherein the file set that replaces the file set with the fixed title includes a playlist file that is to be used as a playlist registered in a Blu-ray disc Java object file or a movie object file, which is referred to by a target title.

5. The information processing apparatus according to claim 1, wherein the file set that replaces the file set with the fixed title and used includes a clip information file and an audio-visual stream file, which are referred to by a playlist file registered in a Blu-ray disc Java object file or the movie object file, which is referred to by a target title.

6. The information processing apparatus according to claim 1, wherein the other information is encrypted sub-content including subtitle data.

7. The information processing apparatus according to claim 1, wherein the other information is used in accordance with use limitations corresponding to a content management unit associated with the other information.

8. A method for controlling an information processing apparatus including a local storage in which a virtual file system is created, the virtual file system supporting an information recording medium on which encrypted content, with respect to which an encryption process has been performed, is recorded, the encrypted content being managed for each of content management units serving as content use management units, and on which content management units used by the encrypted content are set; and a playback unit configured to read and play back the encrypted content managed by the content management units used by the encrypted content by using the virtual file system created in the local storage, configured to receive a data distribution file set for linking other information with the encrypted content of the information recording medium, the encrypted content being distributed from an information distribution server, and configured to update the virtual file system using the received data distribution file set, the method comprising the steps of:

supplying, to a name mapping mechanism of the virtual file system, name mapping information specifying a file set associated with a fixed title, the file set to be exchanged with a file set provided in advance in the local storage, the file set being replaced with a file set downloaded into the local storage and used; and using the fixed title by a plurality of file sets by using the virtual file system, wherein each of a Blue-ray Disc Java object file, a Blue-ray Disc program file, a playlist file, a clip information file, and an audio-visual stream file in the data distribution file set are individually mapped to corresponding virtual file system names associated with the fixed title, when the data distribution file set is to be used.

9. The method for controlling an information processing apparatus according to claim 8, wherein the file set that replaces the file set with the fixed title includes a Blu-ray disc Java object file or a movie object file, which is referred to by a target title.

10. The method for controlling an information processing apparatus according to claim 8, wherein the file set that replaces the file set with the fixed title includes a Java Archive file that is to be used as a Blu-ray disc Java object file program file registered in a Blu-ray disc Java object file, which is referred to by a target title.

11. The method for controlling an information processing apparatus according to claim 8, wherein the file set that replaces the file set with the fixed title includes a playlist file that is to be used as a playlist registered in a Blu-ray disc Java object file or a movie object file, which is referred to by a target title.

12. The method for controlling an information processing apparatus according to claim 8, wherein the file set that replaces the file set with the fixed title includes a clip information file and an audio-visual stream file, which are referred to by a playlist file registered in a Blu-ray disc Java object file or the movie object file, which is referred to by a target title.

13. A non-transitory computer-readable storage medium having computer readable program codes embodied in the computer readable storage medium that, when executed cause a computer to execute:

controlling an information processing apparatus including a local storage in which a virtual file system is created, the virtual file system supporting an information recording medium on which encrypted content, with respect to which an encryption process has been performed, is recorded, the encrypted content being managed for each of content management units serving as content use management units, and on which content management units used by the encrypted content are set;

controlling a playback unit to read and play back the encrypted content managed by the content management units used by the encrypted content by using the virtual file system created in the local storage, to receive a data distribution file set for linking other information with the encrypted content of the information recording medium, the encrypted content being distributed from an information distribution server, and to update the virtual file system using the received data distribution file set; and controlling the virtual file system such that name mapping information specifying a file set associated with a fixed title, the file set to be exchanged with a file set provided in advance in the local storage, the file set being replaced with a file set downloaded into the local storage and used is supplied to a name mapping mechanism of the virtual file system, and the fixed title is used by a plurality of file sets by using the virtual file system, and wherein each of a Blue-ray Disc Java object file, a Blue-ray Disc program file, a playlist file, a clip information file, and an audio-visual stream file in the data distribution file set are individually mapped to corresponding virtual file system names associated with the fixed title, when the data distribution file set is to be used.

14. The non-transitory computer-readable storage medium according to claim 13, wherein the file set that replaces the file set with the fixed title includes a Blu-ray disc Java object file or a movie object file, which is referred to by a target title.

15. The non-transitory computer-readable storage medium according to claim 13, wherein the file set that replaces the file set with the fixed title includes a Java Archive file that is to be used as a Blu-ray disc Java object file program file registered in a Blu-ray disc Java object file, which is referred to by a target title.

16. The non-transitory computer-readable storage medium according to claim 13, wherein the file set that replaces the file set with the fixed title includes a playlist file that is to be used as a playlist registered in a Blu-ray disc Java object file or a movie object file, which is referred to by a target title.

17. The non-transitory computer-readable storage medium according to claim 13, wherein the file set that replaces the file set with the fixed title includes a clip information file and an audio-visual stream file, which are referred to by a playlist file registered in a Blu-ray disc Java object file or the movie object file, which is referred to by a target title.

18. A non-transitory computer-readable storage medium having computer readable program codes embodied in the computer readable storage medium that, when executed cause a computer to execute:

supplying name mapping information to a name mapping mechanism of a virtual file system of an information processing apparatus including a local storage in which the virtual file system is created, the virtual file system supporting an information recording medium on which encrypted content, with respect to which an encryption process has been performed, is recorded, the encrypted content being managed for each of content management units serving as content use management units, and on which content management units used by the encrypted content are set; and controlling a playback unit to read and play back the encrypted content managed by the content management units used by the encrypted content by using the virtual file system created in the local storage, to receive a data distribution file set for linking other information with the encrypted content of the information recording medium, the encrypted content being distributed from an information distribution server, and to update the virtual file system using the received data distribution file set, the name mapping information specifies a file set associated with a fixed title, the file set to be exchanged with a file set provided in advance in the local storage, the file set being replaced with a file set downloaded into the local storage and used, such that the fixed title is used by a plurality of file sets by using the virtual file system, and wherein each of a Blue-ray Disc Java object file, a Blue-ray Disc program file, a playlist file, a clip information file, and an audio-visual stream file in the data distribution file set are individually mapped to corresponding virtual file system names associated with the fixed title, when the data distribution file set is to be used.

19. The non-transitory computer-readable storage medium according to claim 18, wherein the file set that replaces the file set with the fixed title includes a Blu-ray disc Java object file or a movie object file, which is referred to by a target title.

20. The non-transitory computer-readable storage medium according to claim 18, wherein the file set that replaces the file set with the fixed title includes a Java Archive file that is to be used as a Blu-ray disc Java object file program file registered in a Blu-ray disc Java object file, which is referred to by a target title.

21. The non-transitory computer-readable storage medium according to claim 18, wherein the file set that replaces the file set with the fixed title includes a playlist file that is to be used as a playlist registered in a Blu-ray disc Java object file or a movie object file, which is referred to by a target title.

22. The non-transitory computer-readable storage medium according to claim 18, wherein the file set that replaces the file set with the fixed title includes a clip information file and an audio-visual stream file, which are referred to by a playlist file registered in a Blu-ray disc Java object file or the movie object file, which is referred to by a target title.

* * * * *